(12) United States Patent
Oh

(10) Patent No.: US 7,846,580 B2
(45) Date of Patent: Dec. 7, 2010

(54) LITHIUM POLYMER BATTERY WITH A REINFORCEMENT LAYER COVERING AND A METHOD FOR MANUFACTURING THE LITHIUM POLYMER BATTERY

(75) Inventor: Jeong Won Oh, Youngin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 947 days.

(21) Appl. No.: 11/234,875

(22) Filed: Sep. 23, 2005

(65) Prior Publication Data

US 2006/0105237 A1 May 18, 2006

(30) Foreign Application Priority Data

Sep. 24, 2004 (KR) .................. 10-2004-0077223

(51) Int. Cl.
  *H01M 2/08* (2006.01)
  *H01M 2/26* (2006.01)
  *H01M 2/04* (2006.01)
  *H01M 6/00* (2006.01)

(52) U.S. Cl. .................. 429/180; 429/161; 429/176; 29/623.2

(58) Field of Classification Search .................. 429/148, 429/163
See application file for complete search history.

(56) References Cited

U.S. PATENT DOCUMENTS 6,238,820 B1 * 5/2001 Hall ........................ 429/164
6,524,732 B1 * 2/2003 Iwaizono et al. ............ 429/7
6,632,538 B1 * 10/2003 Yamazaki et al. .......... 428/461
6,881,371 B2 4/2005 Iwaizono et al.
7,563,535 B2 7/2009 Hiratsuka
2004/0142236 A1 * 7/2004 Kim et al. .................. 429/144
2004/0224225 A1 * 11/2004 Yamashita et al. .......... 429/181
2005/0208345 A1 * 9/2005 Yoon et al. .................. 429/7

FOREIGN PATENT DOCUMENTS

| CN | 1437275 A | 8/2003 |
| CN | 1470081 A | 1/2004 |
| JP | 2001-222982 | 8/2001 |
| JP | 2003-036822 | 2/2003 |
| JP | 2003-257393 | 9/2003 |
| KR | 2002-0070066 | 9/2002 |
| KR | 2003-0096718 | 12/2003 |

OTHER PUBLICATIONS

Patent Abstracts of Korea for Publication No. 1020020070066 A; Date of publication of application Sep. 5, 2002, in the name of Huruya Kaname et al.

(Continued)

*Primary Examiner*—Dah-Wei D Yuan
*Assistant Examiner*—Kwang Han
(74) *Attorney, Agent, or Firm*—Christie, Parker & Hale, LLP

(57) ABSTRACT

A lithium polymer battery including an electrode assembly having a positive electrode plate, a separator and a negative electrode plate, a pouch type casing in which the electrode assembly is sealingly received, and a reinforcement layer formed over a surface of the casing. Positive and negative electrode tabs are connected to the positive and negative electrode plates, respectively.

10 Claims, 10 Drawing Sheets

OTHER PUBLICATIONS

Patent Abstracts of Korea for Publication No. 1020030096718 A; Date of publication of application Dec. 31, 2003, in the name of Yun Han Jang et al.

SIPO Office action dated May 25, 2007, for corresponding Chinese Patent application 200510105093.5, with English translation, noting Chinese references in this IDS.

* cited by examiner

LITHIUM POLYMER BATTERY WITH A REINFORCEMENT LAYER COVERING AND A METHOD FOR MANUFACTURING THE LITHIUM POLYMER BATTERY

CROSS-REFERENCE TO RELATED APPLICATION

This application claims priority to and the benefit of Korean Patent Application No. 10-2004-0077223 filed on Sep. 24, 2004 in the Korean Intellectual Property Office, the entire content of which is incorporated herein by reference.

BACKGROUND OF THE INVENTION

1. Field of the Invention

The present invention relates to a lithium polymer battery with a reinforcement layer and its manufacturing method, and more particularly to a lithium polymer battery casing with an electrically insulative and thermally conductive reinforcement layer having high strength, and a method for manufacturing the same.

2. Description of the Related Art

As is generally known in the art, lithium polymer batteries have an electrode assembly including a separator between a positive electrode plate and a negative electrode plate. The separator not only isolates the positive and negative electrode plates, but also functions as an ion conduction medium, that is, an electrolyte. Such a separator may be formed from a gel type polyelectrolyte and is manufactured in a state where a high polymer is infused with an electrolyte in order to improve ion conductivity. Besides the improved ion conductivity, the gel type polyelectrolyte has a strong bonding property with electrodes, excellent mechanical properties, is easy manufacture and so forth. A typical gel type polyelectrolyte is a polyvinylidene fluoride (PVDF) based electrolyte commercially available from Bellcore Corporation which is produced by mixing a copolymer of vinylidene fluoride (VDF) and hexafluoropropylene (HFP), a plasticizer and inorganic additives, forming a film and then infusing the film with an electrolyte to gelatinize the film.

A comparison between characteristics of a lithium polymer battery and a lithium ion battery is as follows:

First, since the lithium polymer battery may be constructed in a lamellar structure, it does not necessarily employ a winding process which is required for the manufacture of a lithium ion battery. Thus, an electrode assembly may take a form in which a plurality of plates are laminated, and may be made in a suitable form for an angular structure. Of course, the lithium polymer battery may employ an electrode assembly in a wound form.

Second, an electrolyte of the lithium polymer battery is completely injected within an integrated electrode assembly so that the electrolyte is minimally exposed to the exterior of the battery.

Third, since the lithium polymer battery itself may have a lamellar structure, pressure does not have to be applied when it is formed in an angular shape. Therefore, a battery casing may be made using a thin flexible pouch instead of a thick hard angular or cylindrical can.

If such a flexible pouch is used as the casing of the lithium polymer battery, a thickness of the casing may be significantly smaller than a battery using a can. This allows more electrode assemblies to be received within the same volume, providing for increased battery capacity. Also, since the casing is flexible, the battery may be easily manufactured in a desired shape, allowing it to be easily mountable to a variety of external sets.

In spite of battery capacity increase and workability in various forms, however, the pouch type lithium polymer battery may be weak which may cause many accompanying problems. In the conventional lithium polymer battery, for example, the pouch type casing is likely to be punctured when it is stabbed by a sharp object, such as a needle or a nail, and is easily torn when it is bitten by a pet or other animals. Moreover, if a sharp object pierces the casing and comes in contact with the internal electrode assembly, a short circuit between the positive and negative electrode plates therein occurs, sometimes causing the battery to catch fire or explode.

The conventional lithium polymer battery also has a poor heat radiation characteristic, thereby shortening the effective lifetime of the battery. That is, the pouch type casing cannot actively cope with heat generation occurring during charge/discharge of the battery because its surface is basically formed with nylon or polyethyleneterephthalate (PET) which lowers heat radiation performance. Also, the discharge amount is larger with the increase of temperature, so that the effective lifetime of the battery is rapidly reduced.

Furthermore, if temperature of the battery rises above critical temperature due to heat generation from the battery as stated above, the electrode assembly or the electrolyte may decompose generating a large quantity of gas causing the flexible casing to swell. In addition to the internal heat generation, the swelling of the casing may be increased by external heat supply.

In conventional lithium polymer batteries, the casing uses a metal plate as a core layer. However, since this metal plate is exposed outwardly along circumferences of the casing, it may cause a short circuit between a protective circuit board or a conductor of the external set and the metal plate.

Accordingly, there is a need for a lithium polymer battery which is not easily deformed or pierced by an external force and a battery having a swelling-resistant casing. There is also a need for a lithium polymer battery which has good heat radiation performance and does not cause a short circuit with respect to a protective circuit board, an external set, etc.

SUMMARY OF THE INVENTION

Accordingly, a lithium polymer battery is provided having a casing with a reinforcement layer to prevent the casing from being easily deformed. Additionally, the reinforcement layer may be electrically insulative and thermally conductive which provides good heat radiation and reduces the likelihood of a short circuit.

A lithium polymer battery is provided including a pouch type casing; an electrode assembly including a positive electrode plate, a separator and a negative electrode. The electrode assembly is insertable and sealable in the casing while a positive electrode tab and a negative electrode tab are connected to the positive and negative electrode plate, respectively. A reinforcement layer may be formed with a certain thickness over a surface of the casing.

A method for manufacturing a lithium polymer battery is also provided, the method including providing a casing having a first region of a certain area and a second region which is connected to one side of the first region and having a size capable of covering the first region, at least one of the first and second regions being formed with a drawing portion of a certain depth; sealing an electrode assembly by seating the electrode assembly, to which a positive electrode tab and a negative electrode extending up to the outside of the casing by a certain length are connected, in the drawing portion of the casing and thermally welding the first and second regions of the casing to each other along outer peripheries of the electrode assembly; and forming a reinforcement layer on a surface of the casing.

In this way, the lithium polymer battery and its manufacturing method according to exemplary embodiments of the present invention provide excellent mechanical strength, corrosion resistance and impact resistance by further forming the reinforcement layer having high strength on the surface of the casing. For example, the casing is not easily pierced even when it is stabbed by a sharp object and so components of the internal electrode assembly are not short-circuited with each other.

Also, since the above-mentioned reinforcement layer according to exemplary embodiments of the present invention is electrically insulative, there is a reduced possibility of an electrical short circuit between a metal plate, one component of the casing, and a protective circuit board or a conductor of an external set.

Moreover, since the reinforcement layer according to exemplary embodiments of the present invention is thermally conductive, heat radiation performance is maximized during charge/discharge of the battery, so that lifetime and reliability of the battery are improved.

Furthermore, in the lithium polymer battery according to exemplary embodiments of the present invention, a positive temperature coefficient (PTC) element, which is electrically connected between the electrode assembly and the protective circuit board, comes in direct contact with the reinforcement layer. As a result, the PTC element promptly senses heat generation of the battery and interrupts or reduces the flow of electrical current, which results in improved reliability of the battery.

DETAILED DESCRIPTION

Figure 1:
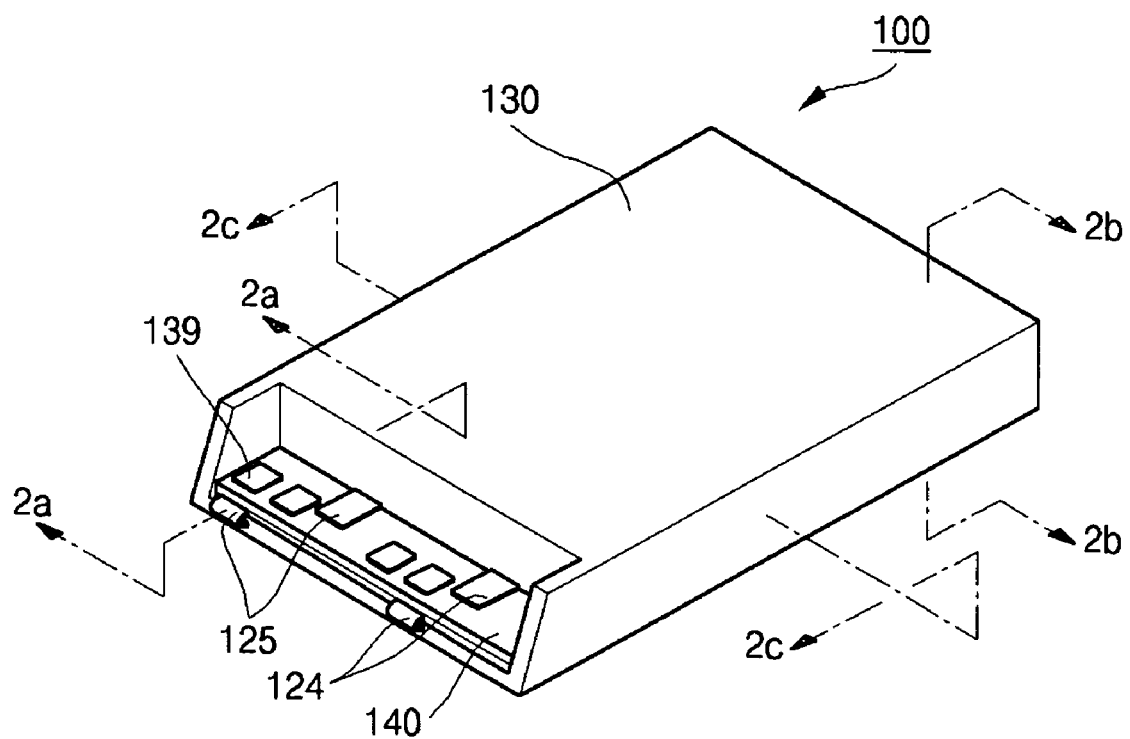
FIG. 1 is a perspective view of a lithium polymer battery formed with a reinforcement layer in accordance with an exemplary embodiment of the present invention.

As shown in FIGS. 1, 2A-2C and 5A-5G the lithium polymer battery assembly 100 in accordance with an exemplary embodiment of the present invention includes a pouch type casing 110, an electrode assembly 120 which is sealingly received in the casing 110, a reinforcement layer 130 which has a certain thickness and covers a surface of the casing 110, and a protective circuit board 140 for controlling charge and discharge states of the battery which is electrically connected to the electrode assembly 120.

The pouch type casing 110 includes a first region 114 and a second region 115 which are folded together and the edges of which are thermally welded to each other. At least one of the first and second regions 114, 115 folded together has a drawing portion 116 of a certain depth such that the electrode assembly 120 may be received therein. The drawing portion 116 may be formed by punching. The drawing portion 116 is formed in the first region 114 in FIG. 1 and FIGS. 2A to 2C, but may be formed in the second region 115 instead of the first region 114. In addition, the drawing portion 116 may be formed in both the first and second regions 114, 115 so as to minimize fracture of the casing which may occur during the formation of the drawing portion 116.

On both sides of the drawing portion 116, the first and second regions 114, 115 of the casing 110 are formed with lateral edge portions 117 which extend out of the drawing portion 116 by a certain length and are thermally welded to each other. In front of the drawing portion 116, the first and second regions 114, 115 are further formed with horizontally extending front edge portions 118 on which a positive electrode tab 124 and a negative electrode tab 125 (described below) are supported. The front edge portions 118 are formed on an upper surface on which a protective circuit board 140 is seated and the front edge portions 118 are thermally welded to each other.

The lateral portions 117 are closely contacted with the sides of the drawing portion 116 so as to minimize the volume of the casing 110 and volume of the lithium polymer battery assembly 100. That is, the lateral portions 117 are folded at a certain angle to come into contact with the sides of the drawing portion 116.

Figure 2A:
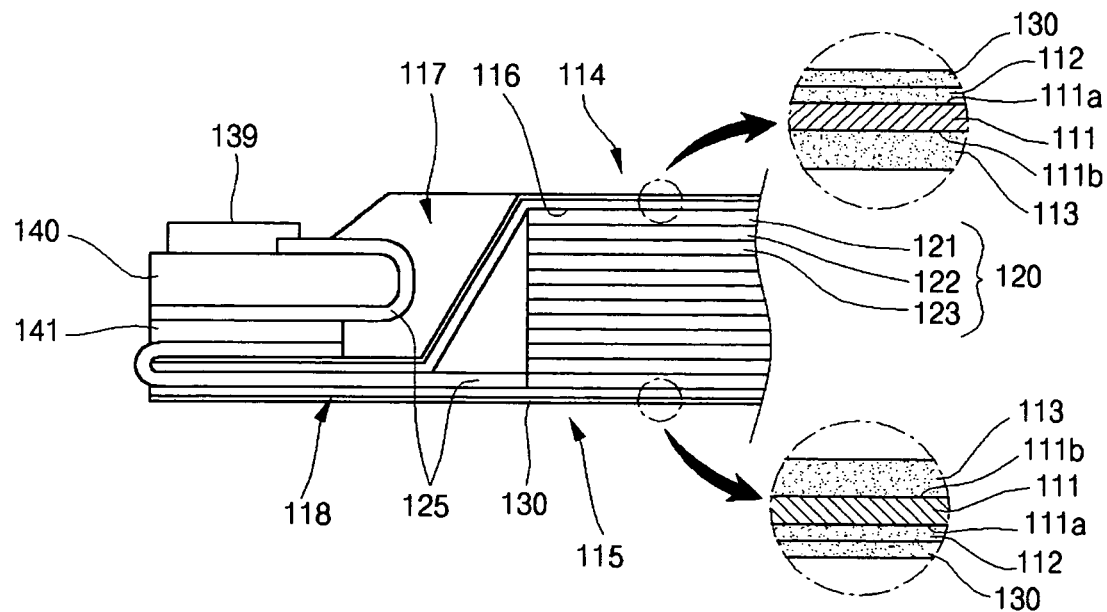
FIG. 2A is a sectional view taken along line 2a-2a in FIG. 1.
Figure 2B:
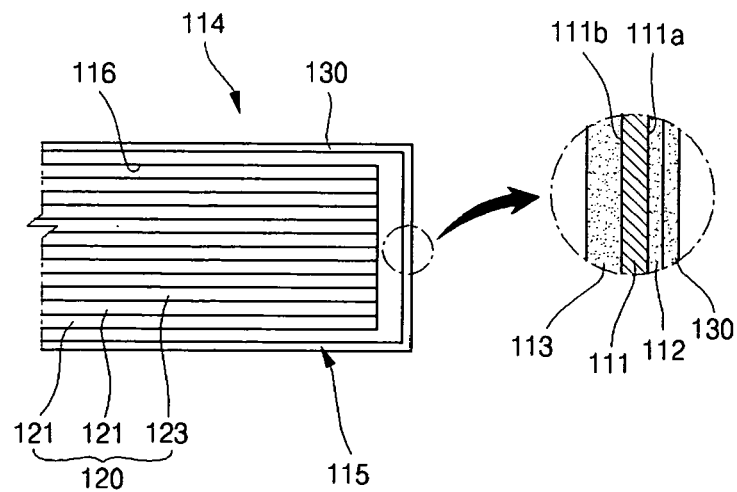
FIG. 2B is a sectional view taken along line 2b-2b in FIG. 1
Figure 2C:
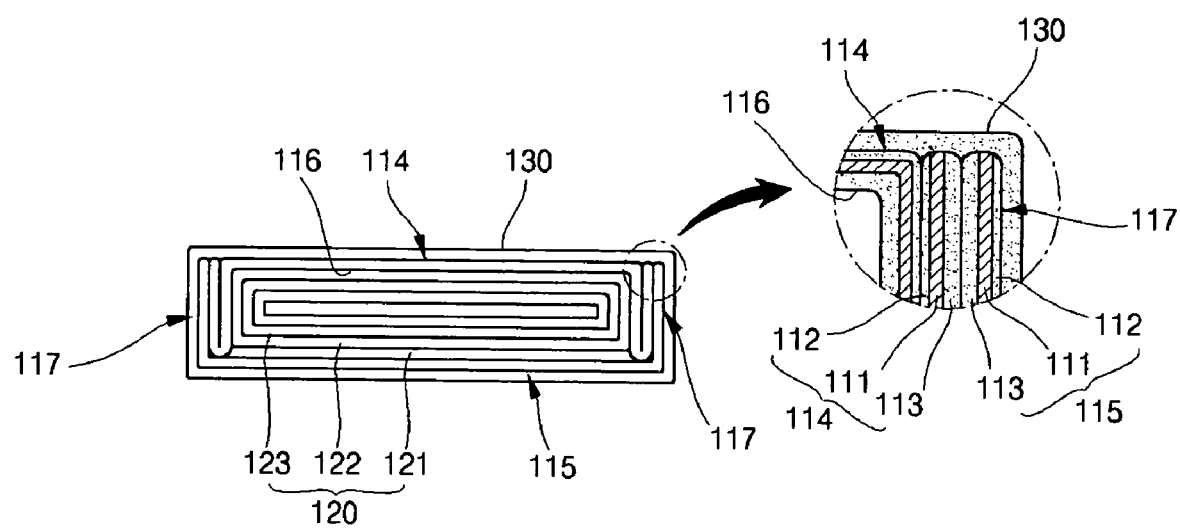
FIG. 2C is a sectional view taken along line 2c-2c in FIG. 1.

Referring to a sectional structure of the casing 110 shown in FIGS. 2A to 2C, a metal plate 111 having a first approximately planar surface 111a and a second approximately planar surface 111b opposite the first surface 111a is located in the middle. With respect to the metal plate 111, the first surface 111a is formed with a first insulative layer 112 constituting an outer surface of the casing 110 and the second surface 111b is formed with a second insulative layer 113 constituting an inner surface of the casing 110.

Here, the metal plate 111 may be made of steel series, aluminum (Al) or equivalents thereof, but its material need not be limited to these. For example, the steel series is an alloy composed of iron (Fe) 84 to 88.2%, carbon (C) 0.5% or less, chrome (Cr) 11 to 15% and manganese (Mn) 0.3 to 0.5%, but may be an alloy composed of iron (Fe) 63.7 to 75.9%, carbon (C) 0.1 to 0.3%, chrome (Cr) 12 to 18% and nickel (Ni) 7 to 12%. Also, the steel series may be any one selected from the group consisting of STS301, STS304, STS305, STS316L and STS321 of Korean Standard (KS) or any one selected from the group consisting of SUS301, SUS304, SUS305, SUS316L and SUS321 of Japanese Industrial Standard (JIS), but the present invention is not limited to these standards.

The first insulative layer 112 may be made of any one selected from the group consisting of nylon, polyethyleneterephthalate (PET) and equivalents thereof, but its material need not be limited to these.

Also, the second insulative layer 113 may be made of cast polypropylene (CPP) or its equivalents, but its material need not be limited to these. This second insulative layer 113 serves as the place where the lateral edge portions 117 and the front edge portions 118 are thermally-welded to each other.

The electrode assembly 120 includes a positive electrode plate 121 to which positive electrode active materials (e.g., lithium cobalt dioxide ($LiCoO_2$), lithium nickel dioxide ($LiNiO_2$), lithium dimanganese tetraoxide ($LiMn_2O_4$) or equivalents thereof) are attached, a negative electrode plate 123 to which negative electrode active materials (e.g., graphite or its equivalents) are attached, and a separator 122 which is positioned between the positive electrode plate 121 and the negative electrode plate 123 to prevent a short circuit and permit only lithium ion migration. Also, the positive electrode plate 121, the negative electrode plate 123 and the separator 122 interposed therebetween are wound in an approximate jelly roll configuration so as to minimize volume of the electrode assembly 120. Of course, such a jelly roll type electrode assembly 120 is sealingly receivable in the casing 110 constructed as described above so that it is safely protected from the external environment and leakage of its electrolyte is prevented.

The positive electrode plate 121 may be made of an aluminum (Al) foil, the negative electrode plate 123 may be made of a copper (Cu) foil and the separator 122 may be made of gel type polyelectrolyte, but the materials need not be limited to these.

A positive electrode tab 124, which extends outwardly from the positive electrode plate 121, is welded to the positive electrode plate 121, and a negative electrode tab 125, which extends outwardly from the negative electrode plate 123, is welded to the negative electrode plate 123. The positive electrode tab 124 and the negative electrode tab 125 extend up to the outside of the casing 110 such that they at least pass horizontally between the front edge portions 118 of the casing 110 and then further extend up to the outside of the casing by a certain length.

The positive electrode tab 124 may be made of aluminum (Al) and the negative electrode tab 125 may be made of nickel (Ni), but their materials need not be limited to these.

The reinforcement layer 130 has a certain thickness and extends throughout all surfaces exposed outwardly in the first region 114, the second region 115, the lateral edge portions 117 and the front edge portions 118 of the casing 110. That is, the reinforcement layer 130 covers the entire casing 110. Additionally, such a reinforcement layer 130 is an electrical insulator and also a thermally good conductor. Thus, the core layer of the casing 110, that is, the metal plate 111, is not exposed outwardly at all, thus reducing the possibility that a short circuit between the metal plate 111 and a protective circuit board will occur. Since the reinforcement layer 130 is a thermally good conductor, it can also effectively radiate heat generated during charge/discharge of the battery.

Materials used for the reinforcement layer 130 may include steel reinforced epoxy putty, copper reinforced epoxy putty, aluminum reinforced epoxy putty or equivalents thereof, but the materials need not be limited to these. The epoxy putty may have a hardness of about 75 to 85, a tensile strength of about 800 to 1000 lbs, an electrical resistance of about 30,000 mΩ and an insulation strength of about 300 v/mil. This epoxy putty will significantly improve the strength, humidity resistance, impact resistance of the casing 110 as well as its insulation and heat radiation performances. Also, this epoxy putty has a shrinkage rate of 1% or less allowing it to be appropriately formable.

The reinforcement layer 130 may be also made of composite materials obtained from various of organic and inorganic materials. In this case, the inorganic material constituting the reinforcement layer 130 may be any one selected from the group consisting of oxides, nitrides and equivalents thereof, but the material need not be limited to these.

The protective circuit board 140 is electrically connected to the positive electrode tab 124 and the negative electrode tab 125 which extend outwardly through the front edge portions 118 of the casing 110 by a certain length. Also, the positive electrode tab 124 and the negative electrode tab 125 are bent in a predetermined form such that the protective circuit board 140, with circuit modules 139 located therein, may be seated on the front edge portions 118 of the casing 110. In addition, a positive temperature coefficient (PTC) element 141 is further connected between the negative electrode tab 125 and the protective circuit board 140. This PTC element 141 is also seated on the front edge portions 118 of the casing 110 and so sensitively responds to temperature of the casing 110. That is, since the front edge portions 118 are formed with the reinforcement layer 130 having a good thermal conductivity and the PTC element 141 is seated on the reinforcement layer 130, the PTC element 141 can promptly sense the rise of temperature in the casing 141 to interrupt or rapidly reduce electrical current flowing along the negative electrode tab 125.

Figure 3:
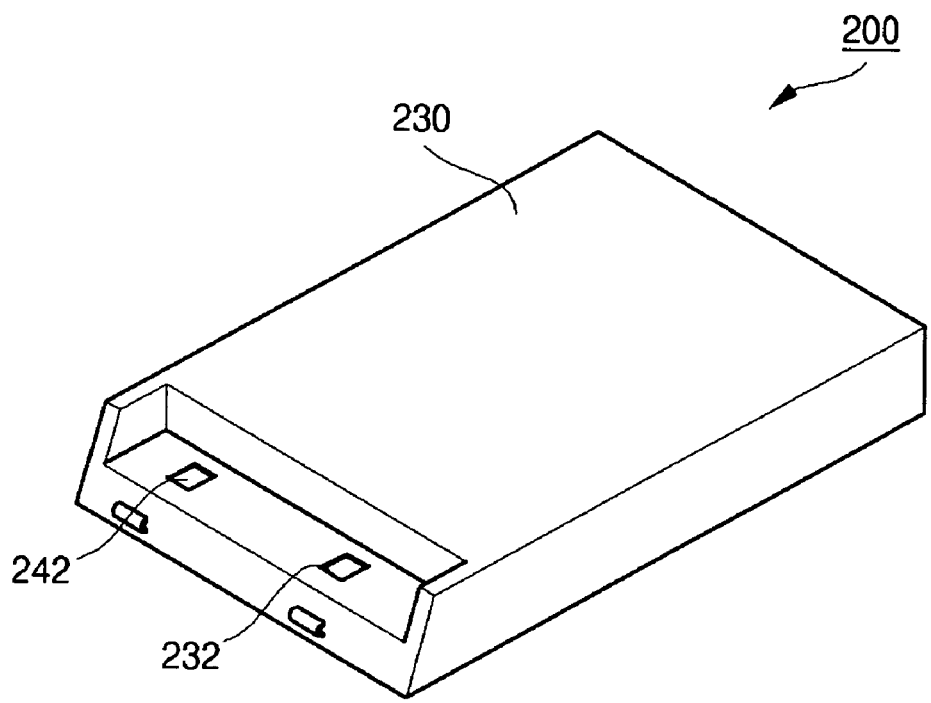
FIG. 3 is a perspective view of a lithium polymer battery formed with a reinforcement layer in accordance with another exemplary embodiment of the present invention.

FIG. 3 illustrates a perspective view of a lithium polymer battery formed with a reinforcement layer in accordance with another exemplary embodiment of the present invention.

As shown in the drawing, the lithium polymer battery 200 in accordance with this embodiment of the present invention includes a reinforcement layer 230 which may cover the protective circuit board and the PTC element together with the casing. That is, the above-described lithium polymer battery assembly 100 includes the reinforcement layer 130 which covers only the casing excluding the protective circuit board and the PTC element, but the reinforcement layer 230 according to this embodiment covers all components of the lithium polymer battery, provided that openings 232 of a predetermined size are formed in the reinforcement layer 230 such that electrically conductive regions 242 of the protective circuit board to be connected to an external device later are exposed outwardly.

When the reinforcement layer 230 integrally covers the casing, the protective circuit board and PTC element, battery strength is further improved and sensitivity of the PTC element increases, raising the safety of the battery.

Figure 4:
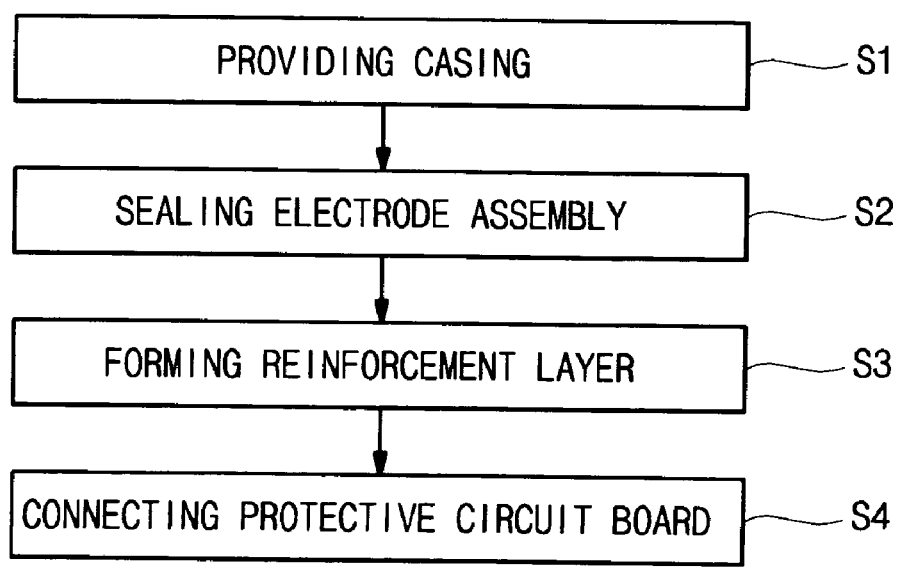
FIG. 4 is a flowchart for explaining a manufacturing method of a lithium polymer battery in accordance with an exemplary embodiment of the present invention.
Figure 5A:
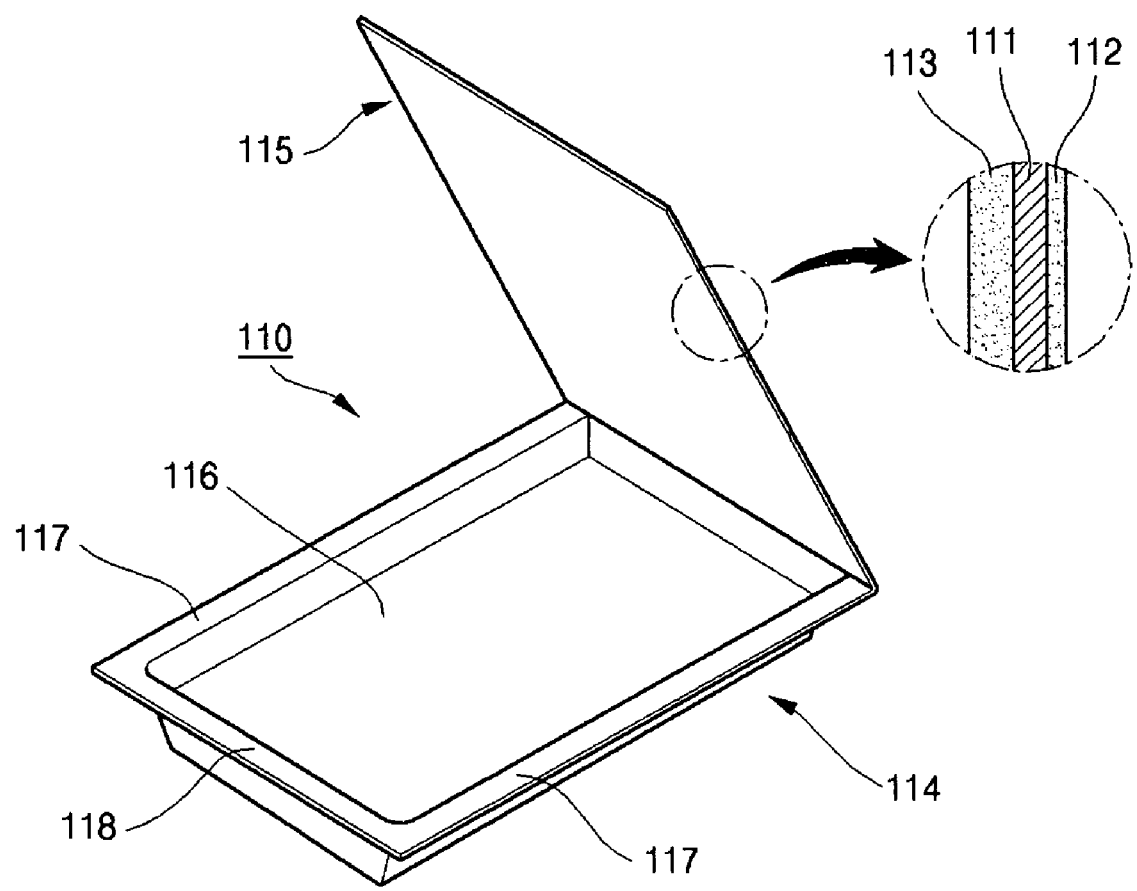
FIGS. 5A, 5B, 5C, 5D, 5E, 5F and 5G are successive perspective views showing the manufacturing method according to exemplary embodiments of the present invention.
Figure 5B:
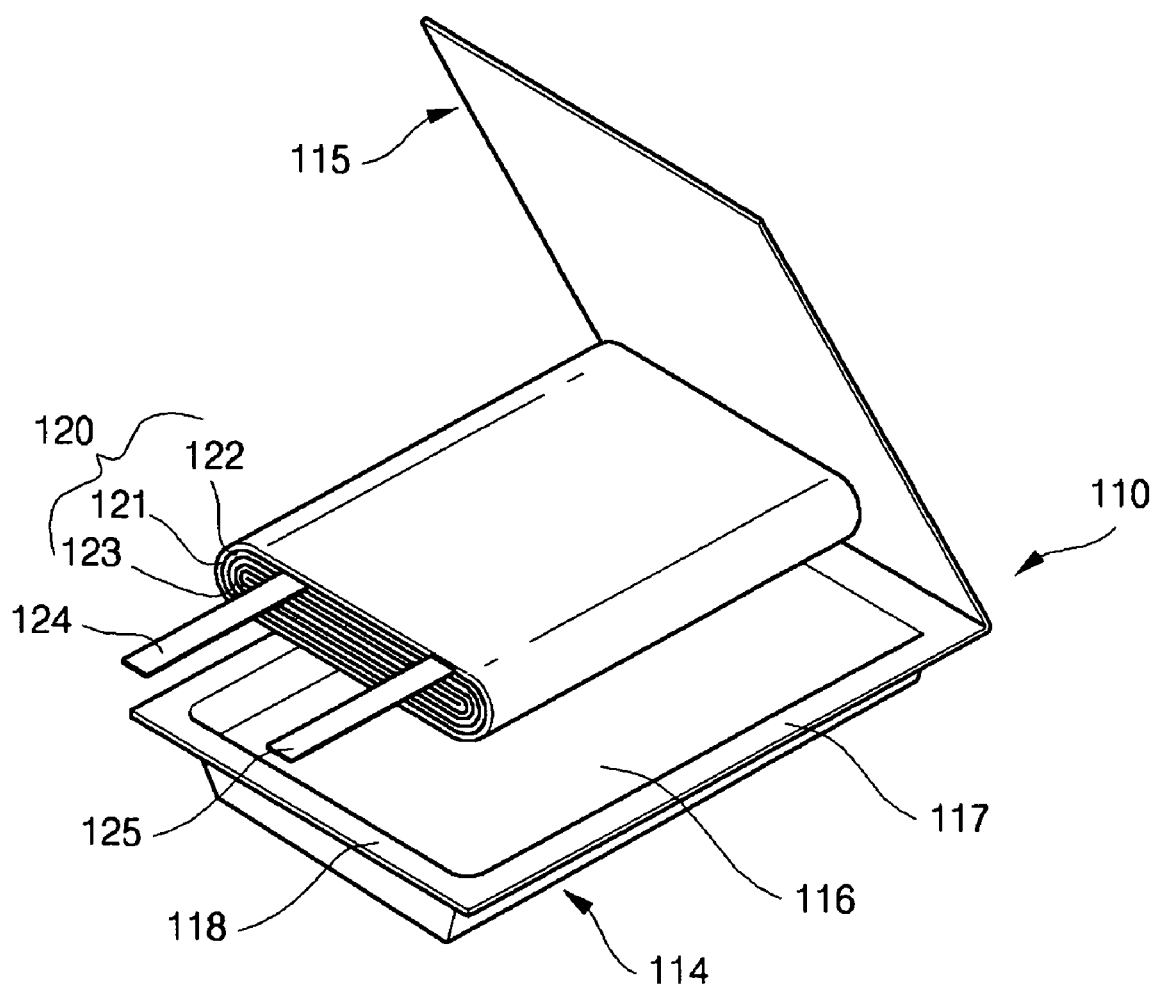
Figure 5C:
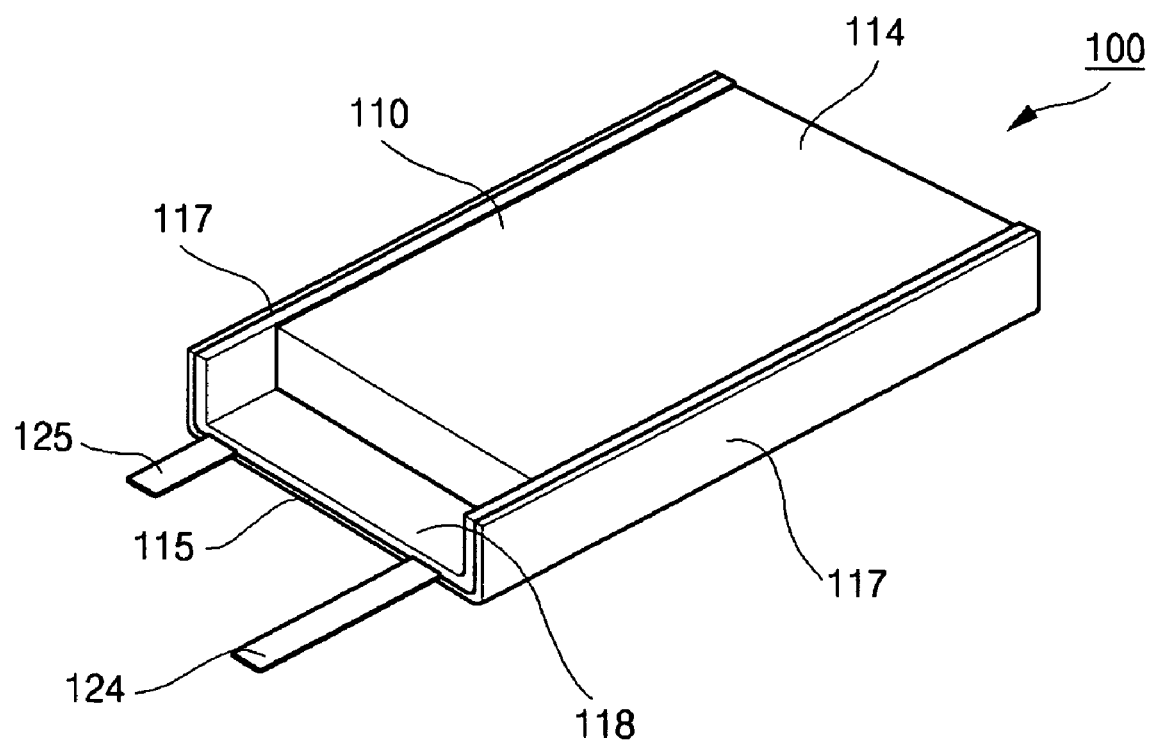
Figure 5D:
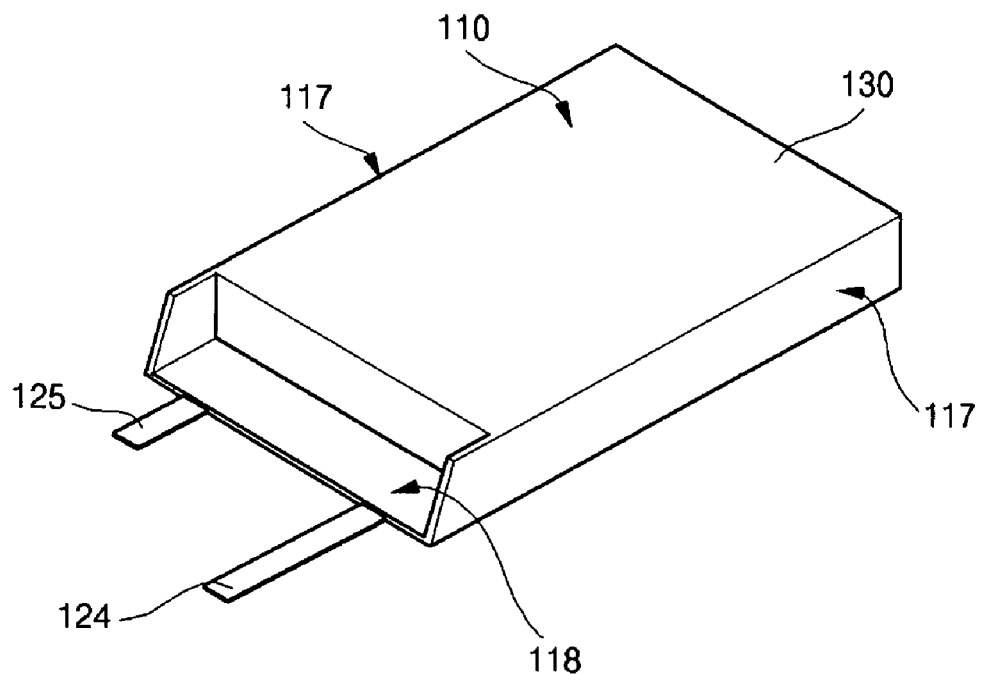
Figure 5E:
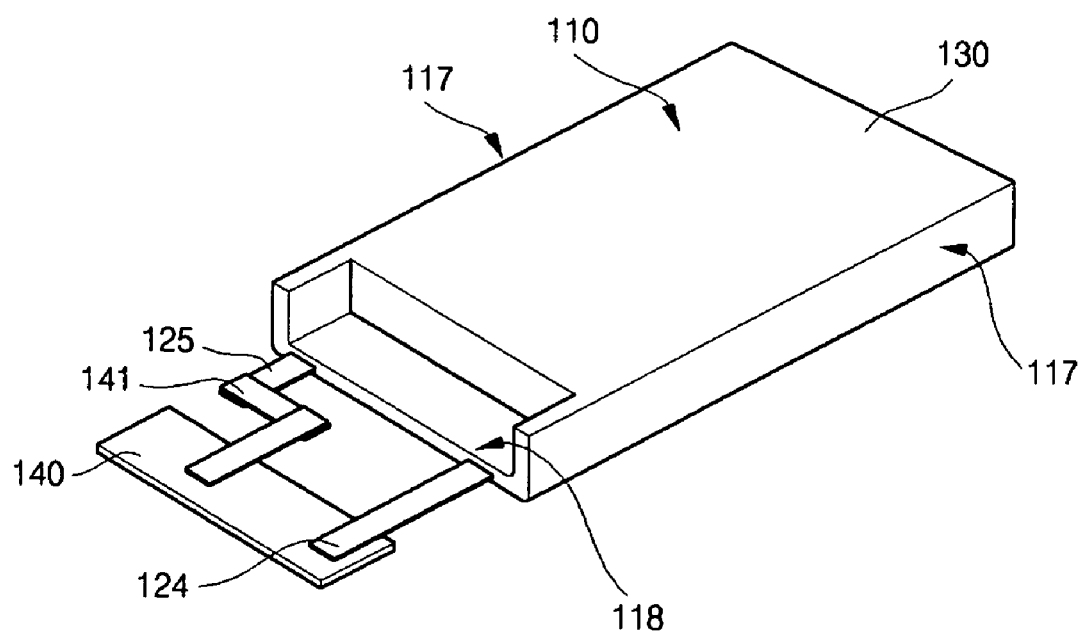
Figure 5F:
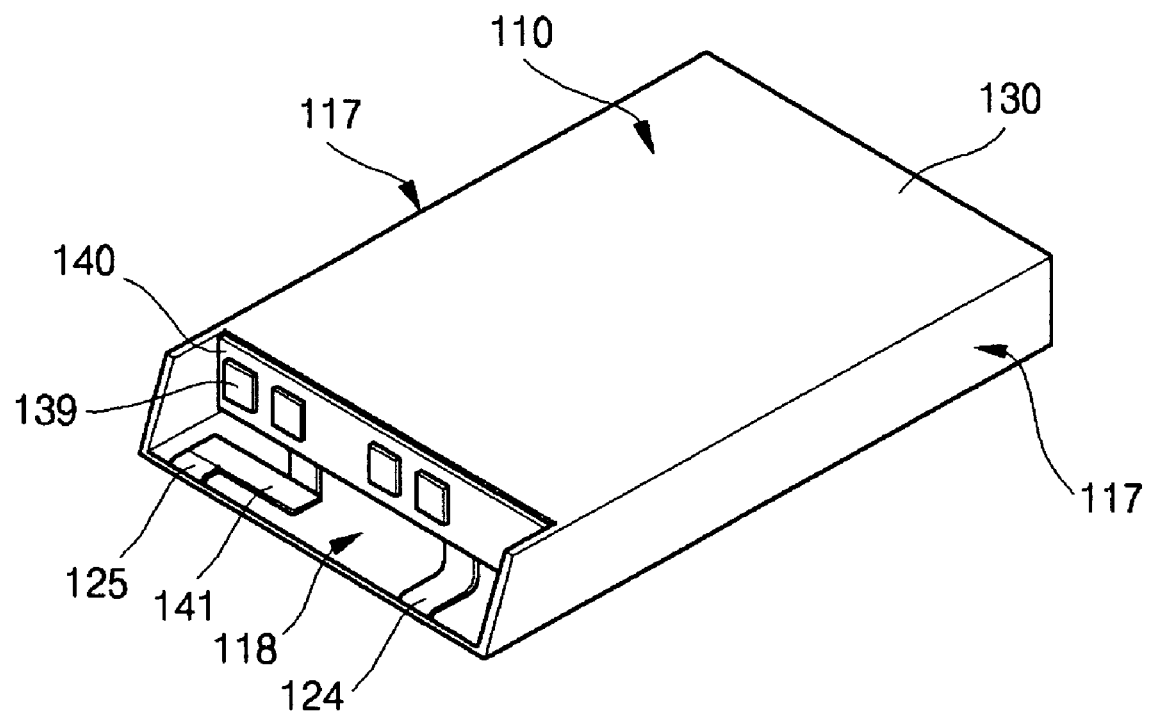
Figure 5G:
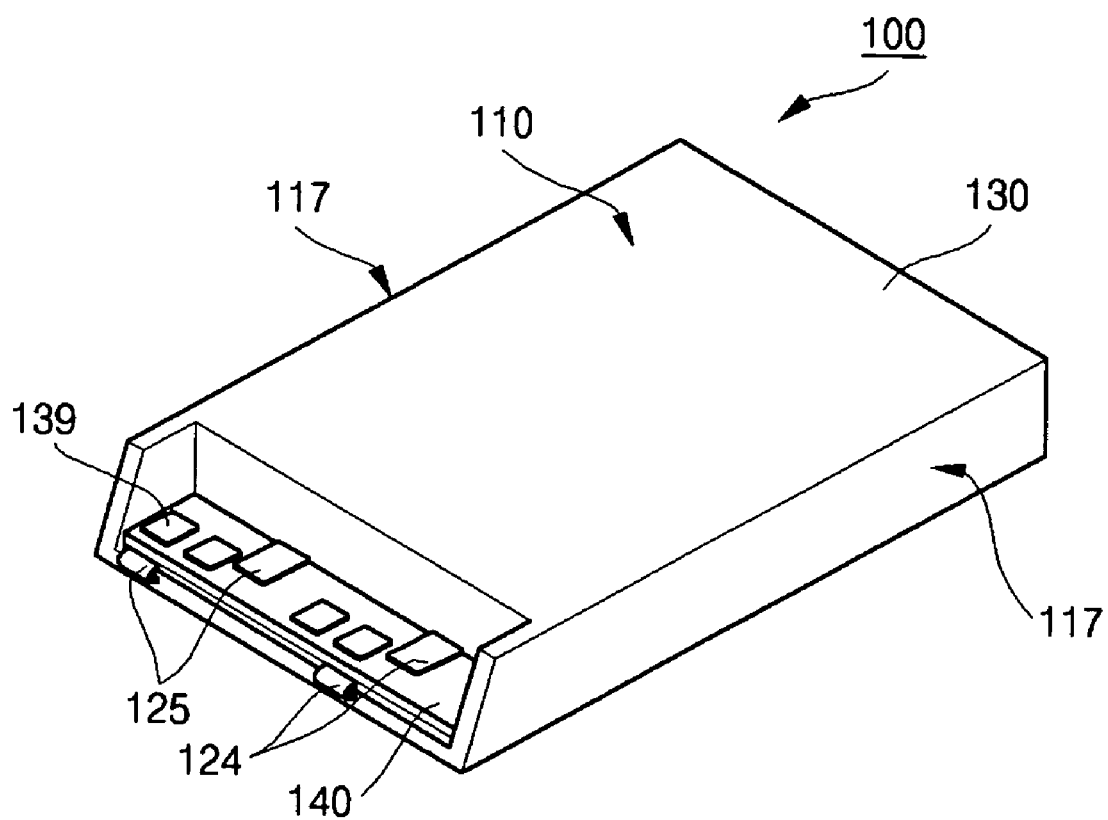

FIG. 4 illustrates a flowchart for explaining a manufacturing method of a lithium polymer battery in accordance with an exemplary embodiment of the present invention. Also, FIGS. 5A to 5G illustrate successive perspective views showing the manufacturing method according to exemplary embodiments of the present invention.

The manufacturing process of a lithium polymer battery assembly 100 according to an exemplary embodiment of the present invention includes providing (S1) a casing 110, sealing (S2) an electrode assembly 120, forming (S3) a reinforcement layer 130 and connecting (S4) a protective circuit board 140.

A casing 110 is provided which has a first region 114 and a second region 115 connected to one side of the first region 114 and having a size capable of covering the first region 114. At least one of the first and second regions 114, 115 is formed with a drawing portion 116 of a certain depth (See FIG. 5A).

On both sides of the drawing portion 116, the first and second regions 114, 115 of the casing 110 are formed with lateral edge portions 117 which extend out of the drawing portion 116 and come into contact with each other. In front of the drawing portion 116, the first and second regions 114, 115 are further formed with front edge portions 118 which extend out of the drawing portion 116 and come into contact with each other. A positive electrode tab 124 and a negative electrode tab 125 to be described below pass horizontally between the front edge portions 118 and extend out of the front edge portions 118 by a certain length.

As stated above, a sectional structure of the casing 110 includes an approximately planar metal plate 111, a first insulative layer 112 which is formed on one side of the metal plate 111 to constitute an outer surface of the casing 110, and a second insulative layer 113 which is formed with a certain thickness on the other side of the metal plate 111 to constitute an inner surface of the casing 110. The metal plate 111 may be made of any one selected from the group consisting of steel series, that is, an alloy composed of iron (Fe), carbon (C), chrome and manganese (Mn) or an alloy composed of iron (Fe), carbon (C), chrome (Cr) and nickel (Ni), aluminum (Al) and equivalents thereof as stated above, but its material need not be limited to these. Also, the first insulative layer 112 may be made of any one selected from the group consisting of nylon, polyethyleneterephthalate (PET) and equivalents thereof, its material need not be limited to these. The second insulative layer 113 may be made of cast polypropylene (CPP) or its equivalents, but its material need not be limited to these. This second insulative layer 113 is where the lateral edge portions 117 and the front edge portions 118 come into contact with each other and are thermally welded to each other during the thermal welding.

To seal (S2) the electrode assembly 120, the electrode assembly 120 including a positive electrode tab 124 and a negative electrode 125 extending up to the outside of the casing 110, is seated in the drawing portion 116 of the casing 110. Then, two pairs of lateral edge portions 117 and a pair of front edge portions 118 of the casing 110 are thermally welded, respectively (See FIG. 5B wherein a state prior to the thermal welding is shown in the drawing). The electrode assembly 120 may be seated in the drawing portion 116 of the casing 110 in a state in which a positive electrode plate 121, a separator 122 and a negative electrode plate 123 are wound many times or are laminated as stated above. Also, as described above, the positive and negative electrode tabs 124, 125 extend up to the outside of the front edge portions 118.

After the thermal welding, the lateral edge portions 117 positioned on both sides of the drawing portion 116 are folded in a predetermined direction to minimize overall volume of the casing 110. For example, the lateral edge portions 117 are folded in a direction that brings the lateral edge portions 117 into close contact with both the sides of the drawing portion 116 (See FIG. 5C which shows a bottom perspective view of the casing 110 after folding).

At this point in time, the metal plate 111 of the casing 110 is exposed outwardly through the lateral edge portions 117 and the front edge portions 118.

Next, a reinforcement layer 130 is formed on all outwardly exposed surfaces of the casing 110 (See FIG. 5D), i.e. the reinforcement layer is formed on the first region 114, the second region 115, the lateral edge portions 117 and the front edge portions 118 of the casing 110. By forming such a reinforcement layer 130, the metal plate 111 is not exposed outwardly through the lateral and front edge portions 117, 118. As stated above, any material selected form the group consisting of steel reinforced epoxy putty, copper reinforced epoxy putty, aluminum reinforced epoxy putty and equivalents thereof may be used as the reinforcement layer 130, but the material need not be limited to these.

The reinforcement layer 130 may be formed by placing the casing 110 in a die and then injecting a liquid reinforcing agent into the die at a high pressure or by directly coating the surface of the casing 110 with liquid reinforcing agent and hardening the reinforcing agent, but the forming technique need not be limited to these specific fashions.

The above-mentioned reinforcement layer 130 leads the lateral edge portions 117 to be more strongly adhered to the sides of the drawing portion 116, and functions to prevent the lateral edge portions 117 from being detached from the drawing portion 116.

In the step of forming a reinforcement layer, the reinforcement layer may be formed of composite materials obtained from various of organic and inorganic materials. Here, any one selected from the group consisting of oxides, nitrides and equivalents thereof may be used as the inorganic material, but the material need not be limited to these.

Next, a protective circuit board 140 is electrically connected to the positive and negative electrode tabs 124, 125 which extend out of the casing 110 from the front edge portions 118. A positive temperature (PTC) element 141 may be interposed between the negative electrode tab 125 and the protective circuit board 140 (See FIG. 5E). After this step, the PTC element 141, the protective circuit board 140 and so on are seated on the front edge portions 118 of the casing 110 by bending the positive and negative electrode tabs 124, 125 in a predetermined form (See FIGS. 5F and 5G). The PTC element 141 may then sense the temperature of the casing 110 because the reinforcement layer 130 having good thermal conductivity is formed on the surface of the front edge portions 118. Also, although not shown in the drawings, adhesive tape that is electrically insulative and thermally conductive may be interposed between the front edge portions 118 and the PTC element 141 and/or between the front edge portions 118 and the protective circuit board 140 so as to prevent the PTC element 141 and the protective circuit board 140 from escaping from the front edge portions 118.

Optionally, it is possible to connect or attach the protective circuit board and the PTC element to the casing and then cover them with the reinforcement layer 130. That is, instead of covering only the casing excluding the protective circuit board and the PTC element with the reinforcement layer 130, the reinforcement layer may cover all components of the battery, further improving the strength of the battery and the sensitivity of the PTC element, thus raising the safety of the battery.

Thereafter, the battery may be formed into an internal pack or an external pack by molding resin, etc. or putting a case on the surface of the reinforcement layer 130.

According to an exemplary embodiment of the manufacturing method of a lithium polymer battery, the lithium polymer battery assembly 100 has a reinforcement layer 130 which has high strength and is electrically insulative and thermally conductive so that not only the battery is difficult to deform and damage by external impact, but it also has improved electrical insulation and heat radiation performance.

As described above, the lithium polymer battery and its manufacturing method according to exemplary embodiments of the present invention provide excellent mechanical strength, corrosion resistance and impact resistance by including a reinforcement layer having high strength on the surface of the soft casing. For example, the casing is not easily pierced even when it is stabbed by a sharp object and so components of the internal electrode assembly are not short-circuited. Also, the reinforcement layer prevents the lithium polymer battery from being easily swelled due to heat internally generated or externally supplied.

Since the above-mentioned reinforcement layer is electrically insulative, there is a reduced possibility of an electrical short circuit between the metal plate, one component of the casing, and the protective circuit board or a conductor of an external set. Moreover, since the reinforcement layer is thermally conductive, heat radiation performance is maximized during charge/discharge of the battery, so that the lifetime and reliability of the battery are improved.

Furthermore, the PTC element, which is electrically connected between the electrode assembly and the protective circuit board, comes in direct contact with the reinforcement layer. Consequently, the PTC element promptly senses heat generation of the battery and interrupts or reduces the flow of electrical current, which results in improved reliability of the battery.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A lithium polymer battery comprising:
    a pouch casing comprising a plate having a first side and a second side, a first insulation layer attached to the first side of the plate, and a second insulation layer attached to the second side of the plate, wherein at least a portion of the pouch casing is folded such that three layers of the plate extend along a lateral edge of the pouch casing;
    an electrode assembly within the pouch casing including a positive electrode, a separator and a negative electrode;
    a positive electrode tab and a negative electrode tab connected to the positive electrode and the negative electrode, respectively;
    a protective circuit board electrically connected to the positive electrode tab and to the negative electrode tab;
    a positive temperature coefficient element between the negative electrode tab and the protective circuit board; and
    an electrically insulative and thermally conductive reinforcement layer for covering the pouch casing, wherein the reinforcement layer comprises steel reinforced epoxy putty, copper reinforced epoxy putty or aluminum reinforced epoxy putty.

2. The lithium polymer battery as claimed in claim 1, wherein the pouch casing includes a first region and a second region being folded against each other to enclose the electrode assembly, and
    wherein at least one of the first region and the second region has a drawing portion into which the electrode assembly is received.

3. The lithium polymer battery as claimed in claim 2, wherein the first region and the second region have lateral edge portions that extend from the drawing portion and are thermally welded to each other, the lateral edge portions being folded such that they contact the drawing portion, and
    wherein the first region and the second region have front edge portions on which a positive electrode tab and a negative electrode tab extending toward an exterior of the lithium polymer battery are supported.

4. The lithium polymer battery as claimed in claim 1, wherein the plate of the pouch casing comprises metal.

5. The lithium polymer battery as claimed in claim 4, wherein the plate comprises a material selected from the group consisting of an alloy comprising iron, carbon, chrome and manganese, an alloy comprising iron, carbon, chrome and nickel, and aluminum.

6. The lithium polymer battery as claimed in claim 1, wherein the first insulation layer comprises a material selected from the group consisting of nylon and polyethyleneterephthalate.

7. The lithium polymer battery as claimed in claim 1, wherein the second insulation layer comprises cast polypropylene.

8. The lithium polymer battery as claimed in claim 1, wherein the reinforcement layer comprises a composite material comprising organic and inorganic materials.

9. The lithium polymer battery as claimed in claim 8, wherein the inorganic material is selected from the group consisting of oxides and nitrides.

10. The lithium polymer battery as claimed in claim 1, wherein the protective circuit board, the positive temperature coefficient element and the pouch casing are covered by the reinforcement layer.

* * * * *